US009415800B2

(12) United States Patent  
Fujita (10) Patent No.: US 9,415,800 B2  
(45) Date of Patent: Aug. 16, 2016

(54) TELESCOPIC ACTUATOR AND VEHICULAR STEERING APPARATUS

(71) Applicant: Showa Corporation, Gyoda-shi (JP)

(72) Inventor: Hiroshi Fujita, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/723,142

(22) Filed: May 27, 2015

(65) Prior Publication Data

US 2016/0167700 A1  Jun. 16, 2016

(30) Foreign Application Priority Data

Dec. 12, 2014  (JP) ................. 2014-251722

(51) Int. Cl.
*B62D 5/04* (2006.01)
*F16H 25/22* (2006.01)
*F16H 25/20* (2006.01)

(52) U.S. Cl.
CPC ............ *B62D 5/0448* (2013.01); *B62D 5/0421* (2013.01); *B62D 5/0454* (2013.01); *B62D 5/0481* (2013.01); *F16H 25/2204* (2013.01); *F16H 2025/209* (2013.01)

(58) Field of Classification Search
CPC .. B62D 5/0448; B62D 5/0421; B62D 5/0454; B62D 5/0481
USPC .................................................. 180/444, 445
See application file for complete search history.

(56) References Cited

U.S. PATENT DOCUMENTS

| | | | | |
|---|---|---|---|---|
| 4,901,831 A | * | 2/1990 | Ito ......................... | B62D 5/043 180/444 |
| 5,135,084 A | * | 8/1992 | Ito ......................... | B62D 5/043 192/38 |
| 7,766,350 B2 | * | 8/2010 | Terada ..................... | B60G 3/20 280/86.757 |
| 8,613,683 B2 | * | 12/2013 | Bidare ..................... | F03G 7/00 475/149 |
| 2002/0157528 A1 | | 10/2002 | Yoshino | |
| 2008/0196966 A1 | * | 8/2008 | Maruyama ........... | B62D 5/0481 180/446 |
| 2009/0241706 A1 | * | 10/2009 | Yuta ....................... | B60G 7/003 74/89.23 |
| 2010/0019465 A1 | * | 1/2010 | Yuta ........................ | B60G 3/20 280/86.758 |
| 2010/0066040 A1 | * | 3/2010 | Suyama ............... | B62D 5/0418 280/5.522 |
| 2016/0016607 A1 | * | 1/2016 | Yoshida ................... | B62D 6/10 180/446 |

FOREIGN PATENT DOCUMENTS

| | | |
|---|---|---|
| JP | 2003-035302 A | 2/2003 |
| JP | 2003-247861 A | 9/2003 |
| JP | 2008-215572 A | 9/2008 |

OTHER PUBLICATIONS

U.S. Appl. No. 14/721,998, filed May 26, 2015, Fujita et al.

* cited by examiner

*Primary Examiner* — Kevin Hurley  
*Assistant Examiner* — Marlon Arce  
(74) *Attorney, Agent, or Firm* — Leason Ellis LLP (57) ABSTRACT

A telescopic actuator includes a rod a support member and a stroke sensor. The support member supports the rod. The stroke sensor is disposed on one end side of the rod. The stroke sensor includes a bar-like section to be detected and a detecting section. The section to be detected can enter into the detecting section. The detecting section detects a length of a portion of the section to be detected that has entered into the detecting section. The rod has a bottomed cylindrical portion that is open toward the one end side. The section to be detected is fixed to a bottom surface of the bottomed cylindrical portion. When the rod is maximally extended, the support member supports an outer peripheral surface of the bottomed cylindrical portion. When the rod is maximally contracted, the detecting section is at least partly housed in the bottomed cylindrical portion.

6 Claims, 6 Drawing Sheets

FIG. 3A (WHEN ROD IS MAXIMALLY EXTENDED)

FIG. 3B (WHEN ROD IS MAXIMALLY CONTRACTED)

FIG. 4
(WHEN ROD IS MAXIMALLY EXTENDED)

(a) <EMBODIMENT>

(b) <COMPARATIVE EXAMPLE>

(WHEN ROD IS MAXIMALLY CONTRACTED)

(c) <EMBODIMENT>

(d) <COMPARATIVE EXAMPLE>

FIG. 5

TELESCOPIC ACTUATOR AND VEHICULAR STEERING APPARATUS

CROSS-REFERENCE TO RELATED APPLICATIONS

This application is based on and claims priority under 35 USC 119 from Japanese Patent Application No. 2014-251722 filed on Dec. 12, 2014, the entire content of which is incorporated herein by reference.

BACKGROUND OF THE INVENTION

1. Field of the Invention

The present invention relates to a telescopic actuator and a vehicular steering apparatus.

2. Description of the Related Art

Many recent four-wheeled vehicles include a vehicular steering apparatus for rear wheels in order to change a steering angle for the rear wheels to a desired angle according to a traveling condition.

Such vehicular steering apparatuses are classified into a right and left integral type in which one actuator allows a right wheel and a left wheel to be collectively steered and a right and left independent type in which an actuator is provided for each of the right and left wheels to allow the right and left wheels to be separately and independently steered.

Furthermore, as an actuator utilized for a right and left independent vehicular steering apparatus, a telescopic actuator is available in which the distance by which a rod protrudes from a housing changes in accordance with forward or backward movement of the rod.

The telescopic actuator normally includes a magnetic stroke sensor that allows the stroke amount of the rod to be measured. The magnetic stroke sensor includes a cylindrical detecting section with a coil that detects a change in magnetic field and a section to be detected that changes the magnetic field as disclosed in Japanese Patent Application Lai-open Nos. 2003-35302, 2003-247861, and 2008-215572.

Patent Literature 1: Japanese Patent Application Laid-open No. 2003-35302
Patent Literature 2: Japanese Patent Application Laid-open No. 2003-247861
Patent Literature 3: Japanese Patent Application Laid-open No. 2008-215572

In this regard, the section to be detected and the detecting section are arranged such that the section to be detected is fixed to one end surface, whereas the detecting section lies opposite the end surface. In other words, the section to be detected and the detecting section are disposed on the same axis, and thus, a space occupied by the rod and the stroke sensor is long in the axial direction of the rod. This is a factor that makes the telescopic actuator large in size.

On the other hand, it is possible to shorten the rod and downsize the telescopic actuator. However, the shortened rod reduces areas supported by support members such as bushes and nuts, resulting in the risk of making forward and backward movement of the rod unstable.

The present invention has been developed in view of these problems. An object of the present invention is to provide a telescopic actuator that is downsized while allowing the rod to move forward and backward stably, and a vehicular steering apparatus.

SUMMARY OF THE INVENTION

To accomplish the object, an aspect of the present invention provides a telescopic actuator including a rod, a support member that supports the rod so that the rod can move forward and backward, and a stroke sensor that is disposed on one end side of the rod to measure a stroke amount of the rod, wherein the stroke sensor includes: a bar-like section to be detected; and a detecting section into which the section to be detected can enter and which detects a length of a portion of the section to be detected that has entered into the detecting section, and the rod has a bottomed cylindrical portion that is open toward the one end side, and the section to be detected is fixed to a bottom surface of the bottomed cylindrical portion and is at least partly housed in the bottomed cylindrical portion, and when the rod is maximally extended, the support member supports an outer peripheral surface of the bottomed cylindrical portion, and when the rod is maximally contracted, the detecting section is at least partly housed in the bottomed cylindrical portion.

According to the above-described invention, the section to be detected and the detecting section are housed in the bottomed cylindrical portion of the rod. Thus, a space occupied by the rod and the stroke sensor is reduced in an axial direction of the rod, allowing the telescopic actuator to be downsized.

Furthermore, although the rod is provided with the bottomed cylindrical portion, the outer peripheral surface of the bottomed cylindrical portion is supported by the support member even when the rod is maximally contracted. This allows stabilization of forward and backward movement of the rod.

Furthermore, to accomplish the object, an aspect of the present invention provides a vehicular steering apparatus including a telescopic actuator including a rod that moves forward and backward to steer wheels of a vehicle, wherein the telescopic actuator includes the rod, a support member that supports the rod so that the rod can move forward and backward, and a stroke sensor that is disposed on one end side of the rod to measure a stroke amount of the rod, and the stroke sensor has a bar-like section to be detected and a detecting section into which the section to be detected can enter and which detects a length of a portion of the section to be detected that has entered into the detecting section, and the rod has a bottomed cylindrical portion that is open toward the one end side, and the section to be detected is fixed to a bottom surface of the bottomed cylindrical portion and is at least partly housed in the bottomed cylindrical portion, and when the rod is maximally extended, the support member supports an outer peripheral surface of the bottomed cylindrical portion, and when the rod is maximally contracted, the detecting section is at least partly housed in the bottomed cylindrical portion.

The present invention provides a telescopic actuator that is downsized while allowing the rod to stably move forward and backward, and a vehicular steering apparatus with the telescopic actuator.

EXPLANATION OF REFERENCE NUMERALS

1 Telescopic actuator
10 Motor
14 Nut (support member)
15 Bush (support member)
20 Rod
22 Bottomed cylindrical portion
23 Bottom surface
24 Inner peripheral surface
25 Outer peripheral surface
30 Stroke sensor
31 Section to be detected
32 Detecting section
33 Cylindrical portion
34 Coil
40 Housing

DETAILED DESCRIPTION OF THE INVENTION

An embodiment of the present invention will be described with reference to the drawings as needed. Furthermore, in the description of the embodiment, an example is taken in which the present invention is applied to a vehicular steering apparatus that steers each rear wheel of a four-wheeled vehicle.

The four-wheeled vehicle is a front-engine front-drive (FF) based four-wheeled vehicle.

Figure 1:
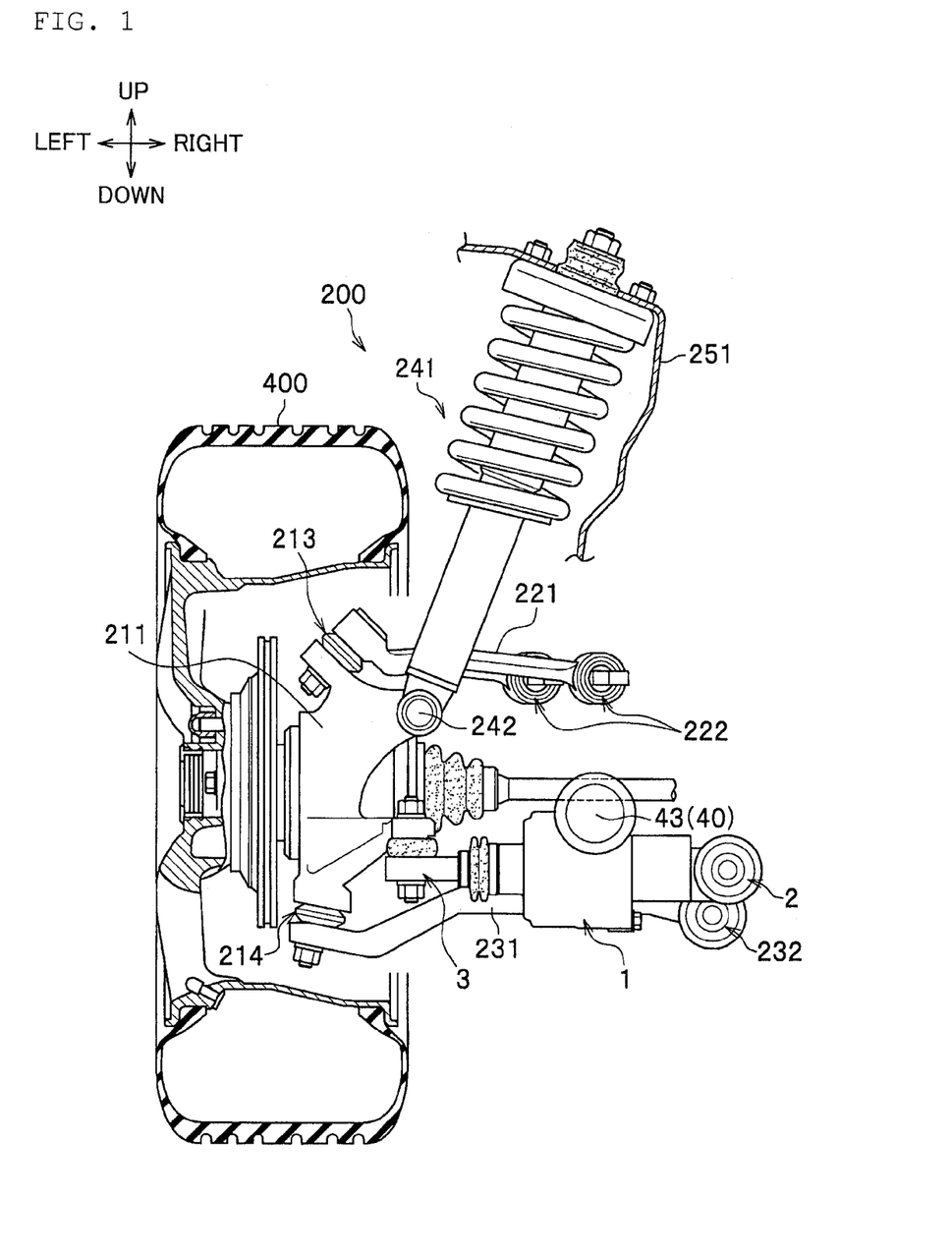
FIG. 1 is a rear view of a suspension apparatus for a left rear wheel of a four-wheeled vehicle as viewed from behind.

As depicted in FIG. 1, a rear wheel 400 is supported by a suspension apparatus 200 of a double wishbone type.

The suspension apparatus 200 includes a knuckle 211 that supports the rear wheel 400 so that the rear wheel 400 can rotate, an upper arm 221 and a lower arm 231 that couple the knuckle 211 to a vehicle body so that the knuckle 211 can move up and down, a damper 241 with a suspension spring which dampens up-down movement of the rear wheel 400, a telescopic actuator 1 that pivots the knuckle 211 to change a steering angle for the rear wheel 400, and a control section 52 that controls the telescopic actuator 1.

A combination of the telescopic actuator 1 and the control section 52 corresponds to a vehicular steering apparatus.

An upper portion of the knuckle 211 is pivotally coupled to a tip portion of the upper arm 221 via a ball joint 213. A lower portion of the knuckle 211 is coupled to a tip portion of the lower arm 231 via a ball joint 214 so as to be able to pivot. The knuckle 211 pivots around the ball joints 213 and 214 to change the steering angle for the rear wheel 400.

A base portion of the upper arm 221 is pivotally attached to the vehicle body via two bushes 222, 222. A base portion of the lower arm 231 is pivotally attached to the vehicle body via two bushes 232 (in FIG. 1, only one of the two bushes is depicted). The upper arm 221 and the lower arm 231 pivot around the base portion side to move the rear wheel 400 up and down.

The damper 241 is a hydraulic damper with a spring. An upper portion of the damper 241 is fixed to a vehicle body 251. A lower portion of the damper 241 is coupled to the knuckle 211 via a bush 242.

A vehicle width-wise inside end portion of the telescopic actuator 1 is coupled to the vehicle body via a bush 2. On the other hand, a vehicle width-wise outside end portion of the telescopic actuator 1 is coupled to the knuckle 211 via a bush 3. Thus, the telescopic actuator 1 is interposed between the vehicle body and the knuckle 211.

Figure 2:
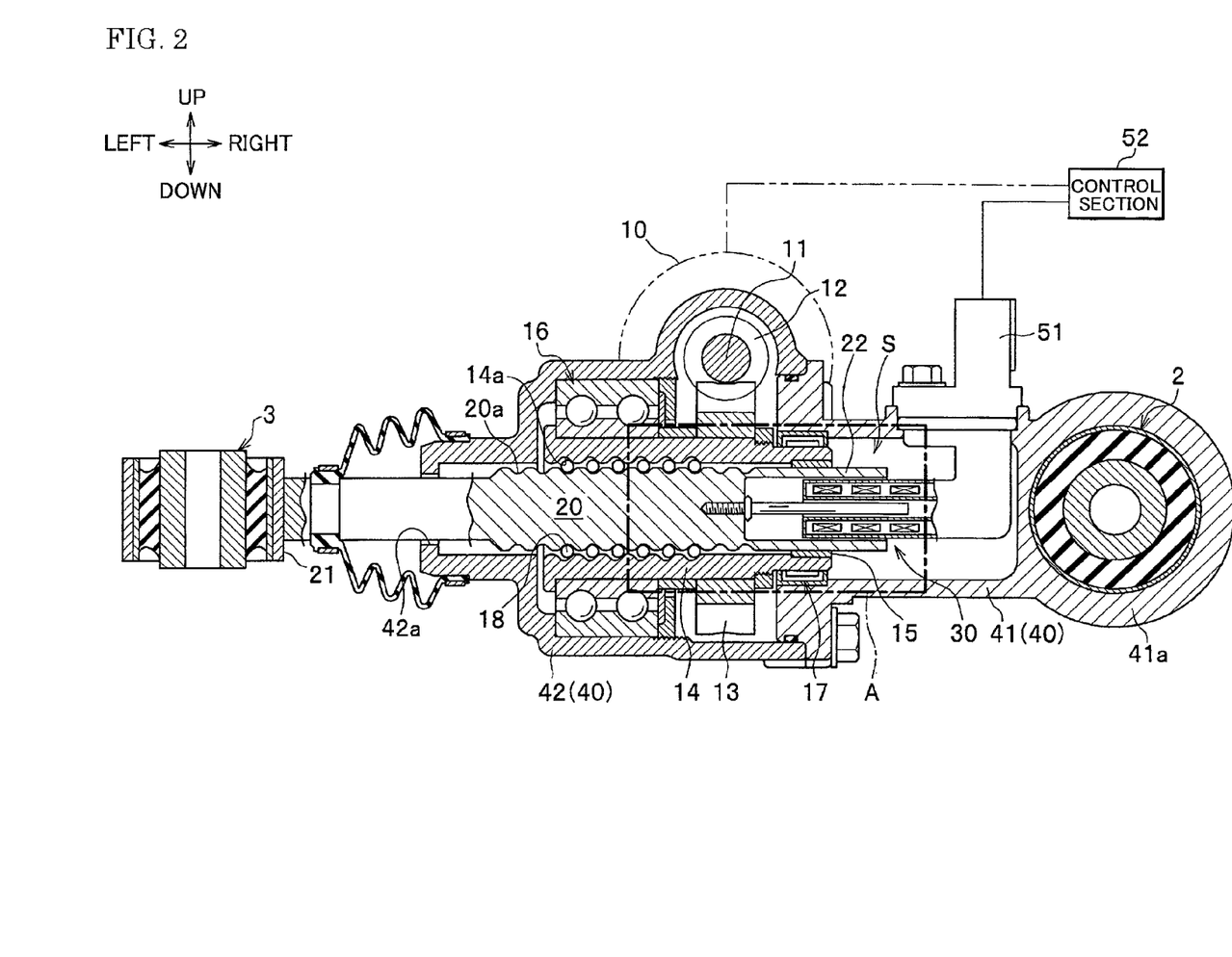
FIG. 2 is a cross-sectional view of a telescopic actuator according to an embodiment as viewed in cross section.

As depicted in FIG. 2, the telescopic actuator 1 includes a motor 10 with a rotating shaft (not depicted in the drawings), a worm shaft 11 coupled to the rotating shaft of the motor 10, a worm gear 12 formed on an outer peripheral surface of the worm shaft 11, a worm wheel 13 that meshes with the worm gear 12, a nut 14 fitted in the worm wheel 13, an annular bush (support member) 15 fitted in a vehicle width-wise inner end of the nut 14, a rod 20 supported by the nut 14 and the bush 15 so that the rod 20 can move forward and backward in the vehicle width direction, a stroke sensor 30, and a housing 40 in which the above-described components are housed.

The housing 40 includes a first housing 41 formed with a ring-shaped annular portion 41a, in which the bush 2 is fitted, at a vehicle width-wise inside end of the housing 40, and a second housing 42 fixed to a vehicle width-wise outside end of the first housing 41, and moreover a third housing 43 (see FIG. 1) fixed to a rear side of the second housing 42.

A generally cylindrical space S extending in the vehicle width direction is formed between the first housing 41 and the second housing 42. The space S is formed to be large enough to house the rod 20 and the stroke sensor 30 arranged in the vehicle width direction. An internal space continuous with the space S is also formed in the third housing 43.

An opening is formed in a vehicle width-wise outside wall portion 42a of the second housing 42, and a vehicle width-wise outside end of the rod 20, which is housed in the space S, protrudes from the housing 40. The third housing 43 is a member in which the motor 10 is housed so that the rotating shaft of the motor 10 points forward.

For the opposite ends of rod 20, an end of the rod 20 housed in the housing 40 is hereinafter referred to as a "first end" and an end of the rod 20 protruding out from the housing 40 is hereinafter referred to as a "second end" for convenience of description.

The worm shaft 11 is pivotally supported by a bearing not depicted in the drawings so as to be able to pivot around a front-rear axis.

The worm gear 12 and the worm wheel 13 are intended to convert rotational motion of the worm shaft 11 around the front-rear axis into rotational motion around a lateral axis.

Furthermore, a nut 14 is fixed to an inner peripheral surface of the worm wheel 13 so that rotational motion of the rotating shaft (not depicted in the drawings) of the motor 10 is transmitted to the nut 14 (ball screw described below) via the worm gear 12 and the worm wheel 13.

The nut 14 is a member that rotates around the lateral axis along with the worm wheel 13.

A ball bearing 16 fitted in the second housing 42 is fitted over the nut 14 and located outward in the vehicle width direction. Furthermore, a roller bearing 17 fitted in the first housing 41 is fitted over the nut 14 and located inward in the vehicle width direction. This stabilizes rotation of the nut 14 around the lateral axis.

Furthermore, a spiral groove 14a is formed in an inner peripheral surface of the nut 14.

The rod 20 is a generally cylindrical member that extends in the vehicle width direction, and is disposed so as to penetrate the nut 14.

A spiral groove 20a is formed in an outer peripheral surface of the rod 20.

Furthermore, a plurality of balls 18 housed both in the spiral groove 14a in the nut 14 and in the spiral groove 20a in the rod 20 is provided between the nut 14 and the rod 20. The nut 14, the rod 20, and the plurality of balls 18 provide a ball screw.

In other words, the telescopic actuator 1 in the present embodiment includes the ball screw, which converts rotational motion of the rotating shaft (not depicted in the drawings) of the motor 10 into linear motion in the axial direction of the rod 20.

When the nut 14 rotates to move (advance) the rod 20 outward in the vehicle width direction, the distance of protrusion of the rod 20 protruding from the housing 40 increases, leading to an increase in the length of the telescopic actuator 1 in the vehicle width direction. On the other hand, when the nut 14 rotates to move (retract) the rod 20 inward in the vehicle width direction, the distance of protrusion of the rod 20 protruding from the housing 40 decreases, leading to an reduction in the length of the telescopic actuator 1 in the vehicle width direction.

At the second end portion of the rod 20, an annular portion 21 is formed in which the bush 3 is fitted. The second end portion of the rod 20 is coupled to the knuckle 211 via the bush 3. Thus, when the rod 20 moves forward or backward, the knuckle 211 pivots to change the steering angle for the rear wheel 400.

Figure 3A:
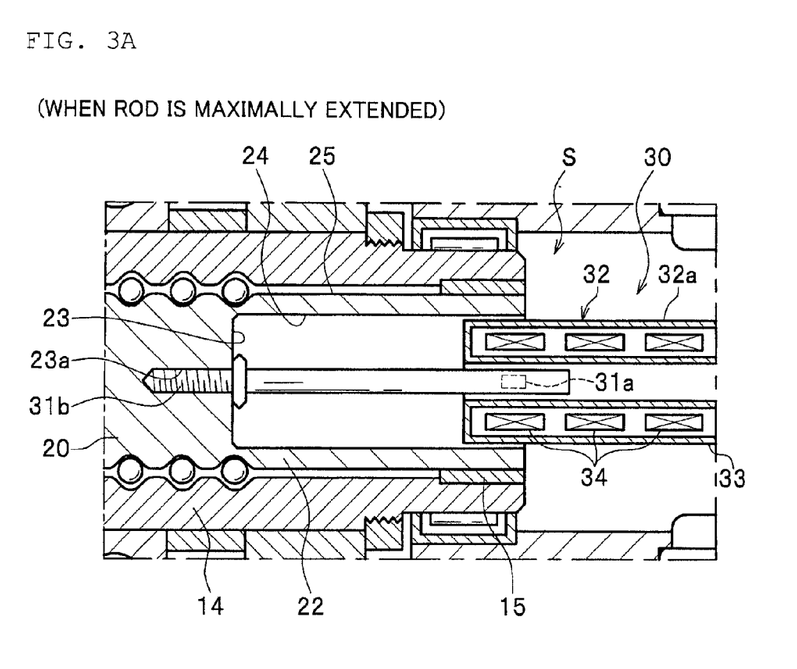
FIG. 3A is an enlarged view of a range enclosed by a frame border A in FIG. 2, depicting that a rod protrudes the longest distance.
Figure 3B:
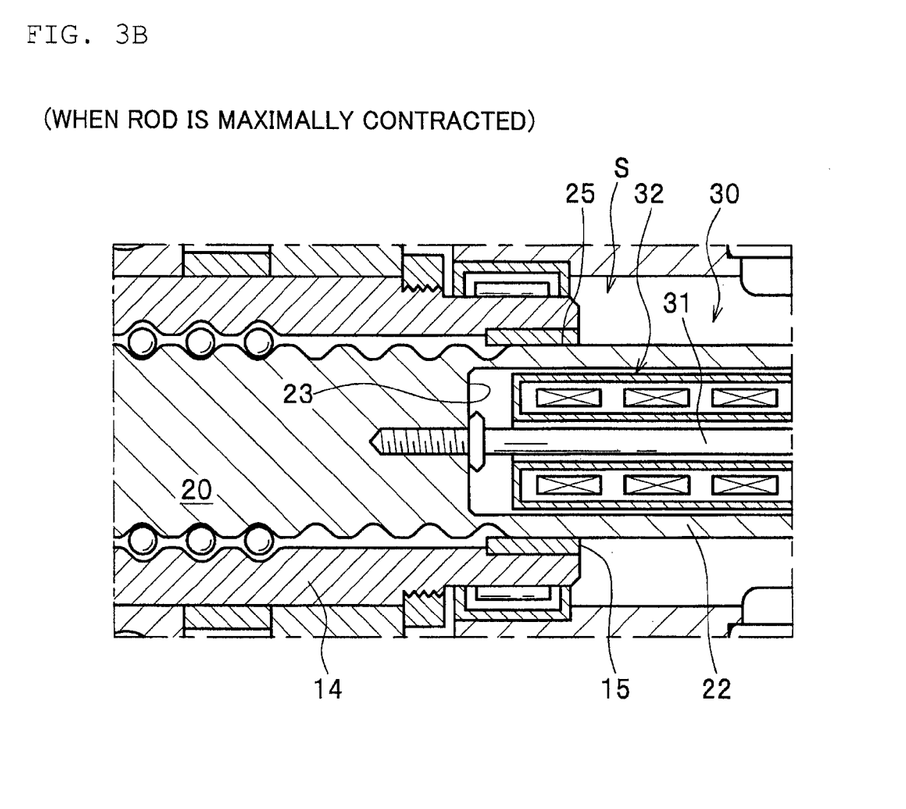
FIG. 3B is an enlarged view of a range enclosed by a frame border A in FIG. 2, depicting that the rod protrudes the shortest distance.

On the other hand, the rod 20 has a bottomed cylindrical portion 22 shaped like a bottomed cylinder and which is open inward (the first end side) in the vehicle width direction. A threaded hole 23a is formed in a central portion of a bottom surface 23 of the bottomed cylindrical portion 22 as depicted in FIG. 3. Other components of the bottomed cylindrical portion 22 will be described below.

The control section 52 is an apparatus that controls the steering angle for the rear wheel 400, and is fixed to the vehicle body rather than in the housing 40.

Furthermore, the control section 52 is connected to sensors such as a vehicle speed sensor and the stroke sensor 30. The control section 52 in the present embodiment is connected to the stroke sensor 30 and the motor 10 by means of wiring as depicted in FIG. 2. The control section 52 determines the traveling condition of the vehicle based on information transmitted by the sensors. The control section 52 then transmits a control signal to the motor 10 to adjust the steering angle for the rear wheel 400 to an angle according to the traveling condition.

The stroke sensor 30 is a magnetic sensor disposed on the first end side of the rod 20 to measure the stroke amount of the rod 20.

The stroke sensor 30 includes a bar-like section to be detected 31 and a detecting section 32 that can be entered by the section to be detected 31 to detect the length of a portion of the section to be detected 31 that has entered the detecting section 32.

The section to be detected 31 is formed of a nonmagnetic substance such as aluminum or stainless steel. Furthermore, as depicted in FIG. 3, a spiral groove 31b that allows for screw threading into the threaded hole 23a in the rod 20 is formed at abase portion side of the section to be detected 31. A cylindrical permanent magnet 31a is buried on a tip portion side of the section to be detected 31.

As depicted in FIG. 2, the detecting section 32 includes a cylindrical portion 33 formed integrally with a coupler 51 and which can be entered by the section to be detected 31, and a plurality of coils 34, 34, . . . arranged in the vehicle width direction in a wall portion providing the cylindrical portion 33.

Furthermore, the detecting section 32 is disposed inside in the vehicle width direction with respect to the section to be detected 31. When the section to be detected 31 enters the detecting section 32 to pass the permanent magnet 31a through the coils 34, the direction of magnetic fields (the direction of magnetic fluxes) in the coils 34 changes.

The coils 34 in the stroke sensor 30 are connected to the control section 52 so that signals from the coils 34, 34, . . . are input to the control section 52. Then, the control section 52 identifies one of the plurality of coils 34, 34, . . . arranged in the vehicle width direction in which the direction of a magnetic field passing through the coil changes, to measure the length of the section to be detected 31 by which the section to be detected 31 has entered the detecting section 32.

Now, the relation among the bottomed cylindrical portion 22, the section to be detected 31, the detecting section 32, and the bush 15 will be described with reference to FIG. 3.

As depicted in FIG. 3, the spiral groove 31b in the section to be detected 31 is screw-threaded in the threaded hole 23a in the bottomed cylindrical portion 22. The section to be detected 31 is fixed to the rod 20 so as to extend inward in the vehicle width direction from a bottom surface 23 of the bottomed cylindrical portion 22. Thus, a part of the section to be detected 31 is housed in the bottomed cylindrical portion 22.

The inner diameter of the bottomed cylindrical portion 22 is larger than the outer diameter of the detecting section 32 so as to enable the detecting section 32 to be housed in the bottomed cylindrical portion 22.

On the other hand, the detecting section 32 is disposed on the first end side (inside in the vehicle width direction) of the rod 20 and opposite the bottom surface 23 of the bottomed cylindrical portion 22.

When the rod 20 is located at the outermost position in the vehicle width direction (when the telescopic actuator 1 is maximally extended) as depicted in FIG. 3A, apart of the detecting section 32 (vehicle width-wise outside end) is housed in the bottomed cylindrical portion 22.

Even when the rod 20 moves the longest distance outward (toward the second side) in the vehicle width direction (when the telescopic actuator 1 is maximally extended) as depicted in FIG. 3A, the bush 15 is in abutting contact with an outer peripheral surface 25 of the bottomed cylindrical portion 22, thereby supporting the rod 20.

Furthermore, when the rod 20 is located at the innermost position (the first end side) in the vehicle width direction (when the telescopic actuator 1 is minimally contracted) as depicted in FIG. 33, the detecting section 32 is mostly housed in the bottomed cylindrical portion 22 without coming into contact with the bottom surface 23 of the bottomed cylindrical portion 22. Additionally, an outer peripheral surface 32a of the detecting section 32 is separated from an inner peripheral surface 24 of the bottomed cylindrical portion 22, making vibration of the rod 20 difficult to transmit to the detecting section 32 during traveling.

Figure 4:
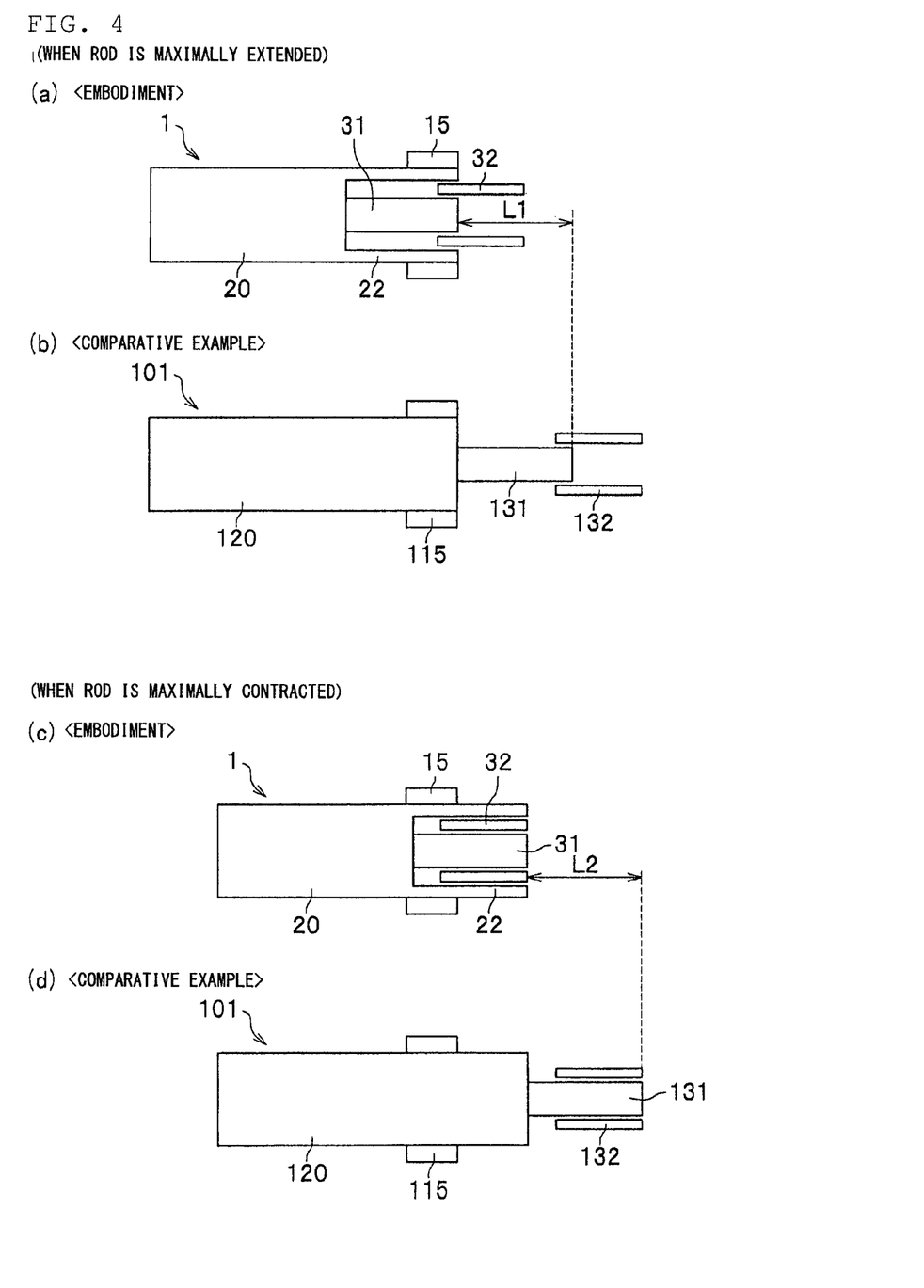
FIG. 4 is that (a) is a schematic diagram depicting that the telescopic actuator in the embodiment is maximally extended, (b) is a schematic diagram depicting that a conventional telescopic actuator is maximally extended, (c) is a schematic diagram depicting that the telescopic actuator in the embodiment is maximally contracted, and (d) is a schematic diagram depicting that the conventional telescopic actuator is maximally contracted.

Now, the effects of the telescopic actuator 1 will be described with reference to FIG. 4 depicting a comparative example. The comparative example depicted in (b) and (d) of FIG. 4 is a conventional telescopic actuator 101. Furthermore, in the conventional telescopic actuator 101, a rod 120 is supported by a bush 115 so that the rod 120 can move forward and backward, a section to be detected 131 is fixed to a first end surface of the rod 120, and a detecting section 132 is disposed opposite the first end surface of the rod 120.

In the telescopic actuator 1 in the embodiment, the section to be detected 31 is housed in the bottomed cylindrical portion 22 as described above.

Thus, in regard to the length of a combination of the rod 20 and the section to be detected 31 in the vehicle width direction, the telescopic actuator 1 in the embodiment is shorter than the conventional telescopic actuator 101 by a length equal to the depth L1 of the bottomed cylindrical portion 22 as depicted in (a) and (b) of FIG. 4. Consequently, the use of the rod 20 provided with the bottomed cylindrical portion 22 reduces the space occupied by the rod 20 and the section to be detected 31 in the vehicle width direction.

Furthermore, in the telescopic actuator 1 in the embodiment, the detecting section 32 is housed in the bottomed cylindrical portion 22 as described above.

Thus, in regard to the position where the detecting section 32 is disposed, the telescopic actuator 1 in the embodiment is closer to the rod 20 than the conventional telescopic actuator 101 by a length L2 as depicted in (c) and (d) of FIG. 4. Consequently, the use of the rod 20 provided with the bottomed cylindrical portion 22 reduces the space occupied by the rod 20 and the detecting section 32 in the vehicle width direction.

As described above, the telescopic actuator 1 in the embodiment reduces the space occupied by the rod 20 and the section to be detected 31 and the space occupied by the rod 20 and the detecting section 32 in the vehicle width direction.

In other words, the space occupied by the rod 20 and the stroke sensor 30 is reduced in the axial direction of the rod 20. This enables contraction of a space S defined by the first housing 41 and the second housing 42, allowing the telescopic actuator 1 to be downsized.

Furthermore, although the rod 20 in the embodiment is provided with the bottomed cylindrical portion 22, the outer peripheral surface 25 of the bottomed cylindrical portion 22 is supported by the bush (support member) 15, allowing forward and backward movement of the rod 20 to be stabilized.

The embodiment has been described. However, the present invention is not limited to the embodiment example.

For example, in the embodiment, a part of the detecting section 32 is constantly housed in the bottomed cylindrical portion 22 (see FIG. 3A and FIG. 3B). However, in the present invention, at least a part of the detecting section 32 may be housed in the bottomed cylindrical portion 22 when the telescopic actuator 1 is maximally contracted.

Even in such a configuration, the detecting section 32 is disposed closer to the rod 20 than in the conventional example. The embodiment can thus contribute to downsizing the telescopic actuator 1.

Furthermore, in the embodiment, the bush 15 supporting the bottomed cylindrical portion 22 is fitted in the nut 14. However, the bush 15 may be fitted in the first housing 41, and no particular limitation is imposed on this configuration.

Additionally, in the embodiment, the support member that supports the bottomed cylindrical portion 22 is the bush 15. Alternatively, the support member may be the nut 14 that rolls the plurality of balls 18 housed in the spiral groove 20a formed in the outer peripheral surface of the rod 20 to move the rod 20 forward and backward.

Figure 5:
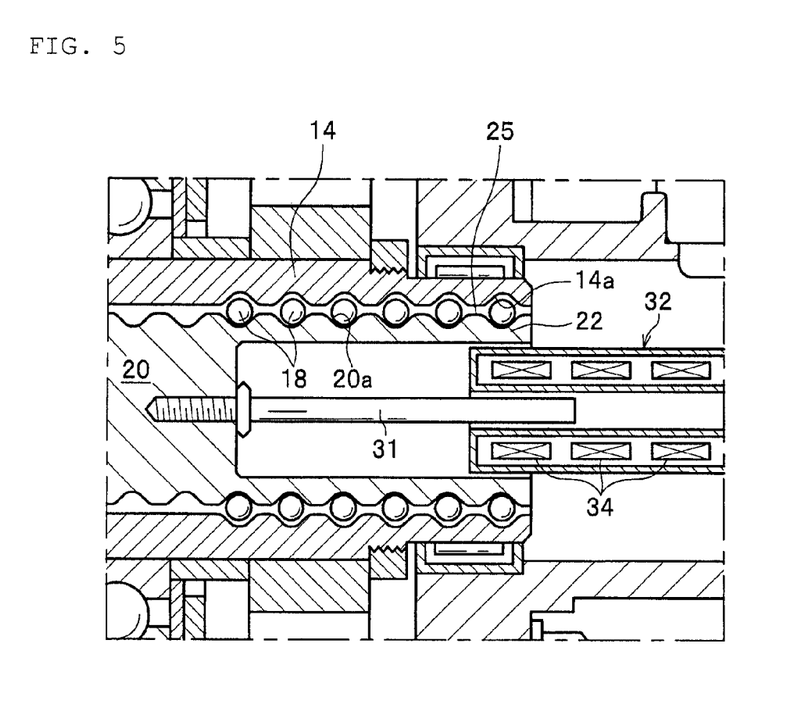
FIG. 5 is a partially enlarged cross-sectional view of a telescopic actuator according to a variation.

Specifically, as depicted in FIG. 5, the nut 14 may be indirectly screw-threaded over a thread groove 20a of the bottomed cylindrical portion 22 via the balls 18 to support the outer peripheral surface 25 of the bottomed cylindrical portion 22.

Alternatively, although not particularly depicted in the drawings, the nut may be directly screw-threaded over the spiral groove in the bottomed cylindrical portion to support the outer peripheral surface of the bottomed cylindrical portion.

Furthermore, for the stroke sensor 30, the example has been taken in which the permanent magnet 31a is provided in the section to be detected 31. However, the present invention is not limited to this. The stroke sensor 30 may be a sensor utilizing a differential transformer or any other well-known sensor.

What is claimed is:

1. A telescopic actuator comprising:
   a rod;
   a support member that supports the rod so that the rod can move forward and backward; and
   a stroke sensor that is disposed on one end side of the rod to measure a stroke amount of the rod,
   wherein the stroke sensor comprises:
   a bar-like section to be detected; and
   a detecting section into which the section to be detected can enter and which detects a length of a portion of the section to be detected that has entered into the detecting section,
   the rod has a bottomed cylindrical portion that is open toward the one end side,
   the section to be detected is fixed to a bottom surface of the bottomed cylindrical portion and is at least partly housed in the bottomed cylindrical portion,
   when the rod is maximally extended, the support member supports an outer peripheral surface of the bottomed cylindrical portion, and
   when the rod is maximally contracted, the detecting section is at least partly housed in the bottomed cylindrical portion.

2. The telescopic actuator according to claim 1, further comprising:
   a motor comprising a rotating shaft; and
   a ball screw,
   wherein rotational motion of the rotating shaft is converted by the ball screw into linear motion in an axial direction of the rod.

3. The telescopic actuator according to claim 2, further comprising:
   a worm gear; and
   a worm wheel that meshes with the worm gear,
   wherein rotational motion of the rotating shaft is transmitted to the ball screw via the worm gear and the worm wheel.

4. The telescopic actuator according to claim 1, wherein the support member is an annular bush.

5. The telescopic actuator according to claim 1, wherein the support member is a nut that rolls a plurality of balls housed in a spiral groove formed in an outer peripheral surface of the rod to move the rod forward and backward.

6. A vehicular steering apparatus comprising a telescopic actuator comprising a rod that moves forward and backward to steer wheels of a vehicle,
   wherein the telescopic actuator comprises:
   the rod;
   a support member that supports the rod so that the rod can move forward and backward; and
   a stroke sensor that is disposed on one end side of the rod to measure a stroke amount of the rod,
   the stroke sensor comprises
   a bar-like section to be detected, and
   a detecting section into which the section to be detected can enter and which detects a length of a portion of the section to be detected that has entered into the detecting section,
   the rod has a bottomed cylindrical portion that is open toward the one end side, the section to be detected is fixed to a bottom surface of the bottomed cylindrical portion and is at least partly housed in the bottomed cylindrical portion, when the rod is maximally extended, the support member supports an outer peripheral surface of the bottomed cylindrical portion, and when the rod is maximally contracted, the detecting section is at least partly housed in the bottomed cylindrical portion.

\* \* \* \* \*